(12) United States Patent
Holeschovsky et al.

(10) Patent No.: US 7,056,407 B2
(45) Date of Patent: Jun. 6, 2006

(54) PROCESS TO LAMINATE POLYOLEFIN SHEETS TO URETHANE

(75) Inventors: Ulrich Holeschovsky, Sewickley, PA (US); Harry Stefanou, Strafford, PA (US)

(73) Assignee: Bayer Antwerpen, Antwerp (BE)

( * ) Notice: Subject to any disclaimer, the term of this patent is extended or adjusted under 35 U.S.C. 154(b) by 597 days.

(21) Appl. No.: 10/028,897

(22) Filed: Dec. 18, 2001

(65) Prior Publication Data

US 2003/0134081 A1 Jul. 17, 2003

(51) Int. Cl.
*B32B 37/00* (2006.01)

(52) U.S. Cl. ................................ 156/272.6; 156/72

(58) Field of Classification Search ............... 156/72, 156/272.2, 272.6, 273.3; 427/532, 533, 535, 427/536, 569; 428/85, 95, 96, 97
See application file for complete search history.

(56) References Cited

U.S. PATENT DOCUMENTS

| | | | | |
|---|---|---|---|---|
| 5,070,121 A | * | 12/1991 | Hinterwaldner et al. | 524/31 |
| 5,244,780 A | * | 9/1993 | Strobel et al. | 430/535 |
| 5,527,629 A | * | 6/1996 | Gastiger et al. | 428/688 |
| 5,578,369 A | * | 11/1996 | Nohr et al. | 442/382 |
| 5,612,113 A | | 3/1997 | Irwin, Sr. | 428/95 |
| 5,714,224 A | | 2/1998 | Gerry | 428/95 |
| 6,299,714 B1 | * | 10/2001 | Takizawa et al. | 156/71 |
| 6,299,715 B1 | * | 10/2001 | Langsdorf et al. | 156/72 |

* cited by examiner

*Primary Examiner*—Gladys J P Corcoran
(74) *Attorney, Agent, or Firm*—Joseph C. Gil; N. Denise Brown

(57) ABSTRACT

The present invention relates to tufted goods comprising a greige good having fibers tufted into a primary backing, a precoat which is adhered to the back surface of the greige good, and a flexible film which is laminated to the back surface of the precoat. The flexible film is treated via corona-discharge prior to being laminated to the precoat. This invention also relates to a process for producing tufted goods. This process comprises treating a flexible film via corona-discharge, contacting the treated flexible film with the uncured or partially cured back surface of a precoated greige good, and curing the article. Optional embodiments of this invention include having a foam layer between the precoat and the flexible film, or having a foam layer on the back surface of the flexible film. An alternate embodiment of this invention comprises substituting a foam layer for the precoat.

11 Claims, No Drawings

PROCESS TO LAMINATE POLYOLEFIN SHEETS TO URETHANE

BACKGROUND OF THE INVENTION

The present invention relates to tufted goods, e.g. carpeting and artificial turf, comprising a greige good with fibers tufted into a primary backing, a precoat and/or foam adhered to the greige good, and a flexible film laminated to the back of the precoat and/or foam wherein the flexible film has been treated via corona-discharge. The present invention also relates to a greige good with fibers tufted into a primary backing, a precoat adhered to the back of the greige good, a flexible film laminated to the back of the precoat, and a foam adhered to the back of the flexible film, wherein the flexible film has been treated via corona-discharge. This invention also relates to a process for producing the finished tufted goods.

Tufted goods, including carpeting and artificial turf, are manufactured by tufting yarns into a primary backing. The tufts are secured by applying at least one adhesive formulation to the primary backing side of the carpet/primary backing ("greige good"). In the past, SBR latexes have seen widespread use as adhesives for such purposes. However, such latexes have numerous drawbacks. First, neither the hydrolytic stability nor the durability of the cured elastomer is entirely satisfactory. Second, as the latex is applied in the form of an aqueous dispersion, considerable energy is expended in evaporating the aqueous component.

Polyurethanes are an alternative to SBR latex. Polyurethanes, in general, exhibit greater chemical and physical stability as compared to SBR latexes. Furthermore, polyurethanes may be applied either as an expandable or as a frothed foam, and may perform the dual function of tuft binding and cushioning.

Tufted carpet and a process for preparing the tufted carpet is described in U.S. Pat. No. 5,714,224. The tufted carpet of the '224 patent comprises a moisture barrier layer. More specifically, this carpet comprises a primary backing stitched with loops of yarn to form a tufted structure projecting outwardly from the primary backing, a layer of latex affixed to the primary backing, a layer of polyolefin affixed to the layer of latex, and a secondary backing comprising a woven polyolefin, which is affixed to the layer of polyolefin. The process described therein comprising providing a primary backing stitched with loops of yarn to form a tufted structure projecting outwardly from the primary backing, providing a secondary backing comprising a woven polyolefin, applying a layer of polyolefin onto the secondary backing, interposing a layer of latex between the primary backing and the polyolefin layer, and laminating the primary backing, the latex layer, the polyolefin layer, and secondary backing layer together.

Carpets having fluid barriers are described in U.S. Pat. No. 5,612,113. These carpets have a primary backing into which tufted yarn is stitched, a secondary backing to provide dimensional stability, and a thin film of a material which is impervious to spills, with the film being bonded to either the primary backing or the secondary backing by an adhesive which is provides an adequate bond and is insoluble to spilled fluids. Suitable materials for the thin film include polyethylene, polypropylene, polyurethane, polyester, polyvinylchloride (PVC), combinations thereof and similar thermoplastic materials which may be surface treated, as well as composite structures formed from laminates of these fibers with non-woven or woven fibers and either with or without reinforcing fibers. Corona treatment of the film on one side is broadly disclosed as possibly being sufficient to render the film bondable to the backing.

Advantages of the presently claimed invention include the fact that tufted goods (including carpets and artificial turf) can now be made without a secondary backing. In general, secondary backings have been necessary in carpets and in processes for producing carpets to provide dimensional stability. Applicants have found that corona-treatment of a flexible film which is contacted or laminated to a polyurethane precoated greige good or to a foam layer applied to a precoated greige good creates a bond that is strong enough to render the resultant cured carpeting article dimensionally stable, with no secondary backing. The delamination strength of these cured tufted goods exceeds that of conventional tufted goods. Although secondary backings can be included in the tufted goods of the present invention, this generally only further increases the costs of the processes and the resultant products, with no further improvements in properties.

SUMMARY OF THE INVENTION

This invention relates to tufted goods comprising (1) a greige good comprising one or more fibers tufted into a primary backing, the greige good having a face surface and a back surface; (2) a precoat having a face surface and a back surface with the face surface being adhered to the back surface of the greige good; and (3) a flexible film, preferably a polyolefin sheet, which is laminated to the back surface of the precoat or the optional foam layer, after being treated via corona-discharge at a power density of 0.2 to 20 Ws/cm$^2$. In an optional embodiment, these tufted goods may also comprise a foam layer. This foam layer may either be adhered to the back surface of (2) the precoat, or it may be adhered to the back surface of (3) the corona-treated flexible film. Although it is possible to add a foam layer to both the back surface of (2) the precoat, and to the back surface of (3) the corona-treated flexible film, this is typically not done due to the added expense of having two foam layers.

An alternate embodiment of the invention comprises tufted goods comprising (1) a greige good comprising one or more fibers tufted into a primary backing, the greige good having a face surface and a back surface, (2) a foam layer having a face surface and a back surface, with the face surface being adhered to the back surface of the greige good; and (3) a flexible film, preferably a polyolefin sheet, which is laminated to the back surface of the foam layer, after being treated via corona-discharge at a power density of 0.2 to 20 Ws/cm$^2$. This embodiment of the invention does not require a precoat as the foam layer fulfills the function of the greige good adhesive.

The present invention also relates to a process for producing tufted goods comprising (A) treating a flexible film with corona-discharge at a power density of 0.2 to 20 Ws/cm$^2$; (B) contacting the corona-discharge treated flexible film with the back surface of a precoated greige good; and (C) curing the resultant article formed in (B). The precoat may be uncured or partially cured prior to the corona-discharge treated flexible film being contacted to the back surface of the precoat.

In accordance with one of the optional embodiments additionally comprising a foam layer, this process comprises contacting the corona-discharge treated flexible film with the back surface of the foam layer adhered to the back surface of a precoated greige good. The precoat may be uncured, partially cured, or fully cured prior to the application of the foam layer. The foam layer may be uncured or partially cured prior to contacting with the corona-discharge treated flexible film.

In accordance with the other optional embodiment additionally comprising a foam layer, this process additionally comprises adhering a foam layer to the back surface of the corona-discharge treated flexible film, after the film has been contacted with the back surface of the precoated greige good, but prior to the curing step. In this embodiment, the precoat may be uncured or partially cured when contacting it with the corona-discharge treated film. Likewise the foam layer may be uncured or partially cured when contacting it with the corona-discharge treated film.

In an alternate embodiment of the present invention, the process for producing tufted goods comprises (A) treating a flexible film with corona-discharge at a power density of 0.2 to 20 $Ws/cm^2$; (B) contacting the treated flexible film with the back surface of a foam layer which is applied to a greige good; and (C) curing the resultant article formed in (B). The foam layer may be uncured or partially cured prior to the corona-discharge flexible film being contacted to the back surface of the foam layer.

DETAILED DESCRIPTION OF THE INVENTION

As used herein, the term tufted goods refers to carpets and artificial turf.

The tufted goods of the present invention are initially prepared in the conventional manner, the greige good being constructed by tufting yarns into a primary woven or non-woven backing of jute, polypropylene, or the like. The primary backing side of the greige good is then contacted with the reactive polyurethane, which is typically mechanically frothed.

The polyurethane may be applied by conventional methods, including dipping, spraying, etc. The frothing of the reactive mixture may be accomplished by using a frothing apparatus, for example an Oakes or Firestone froth head. The thickness of the reactive mixtures may be gauged by a doctor blade, roller, air blade, etc., all well known to the art.

The reactive polyurethane systems comprise one or more di- or polyisocyanates (i.e. an A-side), and an isocyanate-reactive component (i.e. a B-side) which comprises one or more polyols, generally polyols having nominal functionalities of from 2 to 8, one or more low molecular weight chain extenders, one or more polyurethane-promoting catalysts, and optionally components including suitable surfactants, crosslinkers, plasticizers, pigments, and other well known polyurethane additives. In general, a filler is also employed. Generally, there exist two types of the above described reactive polyurethane systems. The first is generally referred to as a precoat. The primary purpose of precoats is as adhesive, i.e. to lock the yarn into place to provide tuftbind and to penetrate the fiber bundles to prevent pilling and fuzzing. Precoats typically contain higher levels of chain extenders in the B-side, thus using higher levels of the A-side component (i.e. polyisocyanate) which generally results in a harder polymer. The second type of reactive polyurethane system is a foam cushion formulation, which uses less chain extender, thus yielding a softer polymer. The primary purpose of the foam cushion formulations is to provide a cushioning layer in the resultant tufted goods. Preferred reactive polyurethane systems to be used in the present invention are described in detail in, for example, U.S. Pat. Nos. 5,462,766, 5,558,917, 5,723,194, 6,171,678 and 6,265,775, the disclosures of which are herein incorporated by reference.

The above formulations are typically frothed to various degrees, depending on the use of either a precoat or a foam cushion layer. The degree of the mechanical frothing depends on the function. Precoats are frothed only lightly, typically to cupweights varying between 500 and 1200 g/l, with filler loadings ranging from 150 to 300 g/100 g of the B-side (i.e. isocyanate-reactive component including chain extender, catalyst, and optional additives such as surfactants, etc.). This yields polymers with relatively high density that maximize tuft binds. Formulations that serve as the foam cushioning layer are frothed more, typically to cupweights ranging from 300 to 700 g/l, with somewhat lower filler loadings. The filler loadings for a foam cushioning layer typically range from 80 to 200 g/100 g of the B-side (i.e. isocyanate-reactive component including chain extender, and optional additives such as surfactants, etc.). In some instances, when the requirements for tuft binds are low, a low-density foam formulation may be directly applied to the greige good, without first applying a precoat.

Frothing of the formulations described above can be accomplished as described in, for example, U.S. Pat. No. 5,604,267, the disclosure of which is herein incorporated by reference. Frothing may also be accomplished in the conventional manner by introducing the reactive ingredients together with a substantially inert gas such as air, nitrogen, argon, carbon dioxide, or the like, into a froth mixer such as an Oakes or Firestone mixer. The frothed mixtures are generally gauged with a doctor blade or roller, or the like, to the desired thickness. Frothed mixtures may also include a volatile or reactive blowing agent in addition to being mechanically frothed, to produce a foam with a relatively low density.

Blowing agents in blown and froth/blown foams may be selected from those conventionally used, including fluorochlorocarbons, in particular R-22 (dichlorodifluoromethane), but are more preferably low boiling hydrocarbons, ketones, ethers, carbonates, or the like, and most preferably is water, either alone or in conjunction with another blowing agent. Solid blowing agents may also be useful but are not preferred. Blown foams are also gauged initially with a doctor blade, roller or the like, but are often regauged by a belt coated with a release agent or by an embossed roller after the foam has cured to the stage where it is still partially uncured but non-tacky.

Suitable flexible films to be used in the present invention include, for example, flexible films having a thickness of from about 0.025 to about 1 mm, preferably from about 0.1 to about 0.5 mm. Suitable materials for the flexible films include, for example, polyolefins such as polypropylene, polyethylene, ethylene-vinyl acetate copolymers, polyvinylchloride (PVC), polyurethane, polyester, etc.

In accordance with the present invention, the flexible film is treated via corona-discharge prior to being laminated or adhered to the back surface of the precoat or of a foam layer applied to the precoated greige good, or to the back surface of the precoat on one side and the top surface of a foam layer on the other side. Corona-discharge treatment of the flexible film is at a power density of 0.2 to 20 $Ws/cm^2$, preferably 0.5 to 10 $Ws/cm^2$, and most preferably 1 to 5 $Ws/cm^2$. The power density of the corona discharge necessary to render a polyolefin sheet suitable for the present invention depends on the thickness of the sheet. For a typical polyolefin film with a thickness of about 0.5 mm, a power density of 1 to 5 $Ws/cm^2$ should suffice. To assure good bonding, the surface tension of the film after the treatment should exceed 48 dyne/cm. Although corona-discharge treatment is known to improve the bonding of flexible films to other substrates, it has not previously been known to provide enough bonding strength to render a tufted good dimensionally stable such that the secondary backing required in conventional finished carpets can be completely eliminated.

Curing of the articles formed by the presently claimed process generally occurs at residence times of 2 to 10 minutes, and at oven temperatures of 65 to 150° C.

In accordance with the presently claimed process of producing tufted goods, the treated flexible film is contacted with the back surface of the precoated greige good wherein the precoat is uncured or partially cured, or with the back surface of a foam layer which is applied to a precoated greige good and in which the foam layer is uncured or partially cured. In the embodiment having a foam layer applied to a precoated greige good, the precoat of the precoated greige good may be uncured, partially cured or fully cured.

In the embodiment in which the corona-discharge treated flexible film is sandwiched between a precoat and a foam cushion layer, the treated flexible film is contacted with an uncured or partially cured precoat and an uncured foam layer. This may be accomplished in one processing step when operating with two puddles where precoat, flexible film and foam cushion layer are applied sequentially, and then cured jointly. Alternatively, the process may be accomplished in two processing steps. First, the precoat is applied to the greige good and then contacted with the film followed by complete cure. In the second step, the uncured foam layer is applied to the other side of the flexible film that is laminated to the precoat, then gauged, and subsequently cured.

In general, lamination of the flexible film may be affected by using a marriage roller. In some cases, the tentering of the greige good and the film on the same tenters may lead to sufficient contact between the reactive mixture and the film, making the use of a marriage roller unnecessary.

The following examples further illustrate details for the preparation and use of the compositions of this invention. The invention, which is set forth in the foregoing disclosure, is not to be limited either in spirit or scope by these examples. Those skilled in the art will readily understand that known variations of the conditions and processes of the following preparative procedures can be used to prepare these compositions. Unless otherwise noted, all temperatures are degrees Celsius and all parts and percentages are parts by weight and percentages by weight, respectively.

EXAMPLES

A variety of plastic films were treated using a lab corona treater available from Tantec Inc., Schaumburg, Ill., model HV 202. The plastic films were placed on a metal sheet acting as a counter-electrode and treated with a 4" wide hand-held roller electrode, with an effective treating width of 8.2 cm, also supplied by Tantec Inc. The speed of the roller was set to move the plastic film through the corona discharge treater at a rate of about 2.5 cm/sec. The film surface tensions were measured prior to corona discharge treatment, 10 minutes after the corona discharge treatment and about 24 hrs. after the corona discharge treatment, using surface tension inks from Sherman Treaters Inc. Table 1 below shows the film thickness and surface tension data, as well as the approximate power density of the corona discharge used to treat the sheets.

TABLE 1

|  | Film Thickness (mm) | Surface Tension Before Treatment (dynes/cm) | Surface Tension 10 mins. after Treatment (dynes/cm) | Surface Tension 24 hrs after Treatment (dynes/cm) | Power Density (Ws/cm$^2$) |
| --- | --- | --- | --- | --- | --- |
| High Density Polyethylene | 0.15 | 32 | 57 | 57 | 3.1 |
| Low Density Polyethylene | 0.23 | 35 | 56 | 55 | 2.4 |
| Ethyl VinylAcetate | 0.23 | 37 | 56 | 56 | 2.4 |
| Polypropylene | 0.11 | 34 | >54 | 54 | n.m. | n.m = not measured

Two different formulations were applied to the surface treated films from Table 1, shortly after the 24 hr. post-treatment surface-tension measurement. The first formulation produces a relatively soft foam suitable for a carpet cushion. The second formulation is a suitable precoat formulation. The thickness of the urethane layers on the film was about 5 mm. The following components were used in these formulations:

Polyol A: a propylene oxide triol having a hydroxyl number of about 36 mg KOH/g and an ethylene oxide cap of about 19%

Polyol B: a propylene oxide diol having a hydroxyl number of about 40 mg KOH/g and an ethylene oxide cap of about 15%

Isocyanate A: an isocyanate having a functionality of about 2.15, an NCO group content of about 27.5%, and containing about 48% monomeric 4,4'-diphenylmethane diisocyanate, about 10% monomeric 2,2'- and 2,4'-diphenylmethane diisocyanate, and about 18% higher ring homologues of the diphenylmethane diisocyanate series, with the remainder being the adduct of 4,4'-diphenylmethane diisocyanate with tripropylene glycol such that the urethane group content of the isocyanate mixture was about 4.2%

The formulation details are set forth below.

|  | Formulation 1: Foam Cushion: | Formulation 2: Precoat: |
| --- | --- | --- |
| Polyol A | 56 | 65 |
| Polyol B | 35 | 18 |
| Diethylene glycol | 8 | 16 |
| Silicone Surfactant | 2 | — |
| Urethane Catalyst | 1.6 | 1.6 |
| Wetting Agent | 0.8 | 0.9 |
| Anti-Settling Agent | 2 | 1.5 |
| CaCO3 | 100 | 133 |
| Aluminum trihydrate | 0 | 67 |
| MDI Prepolymer | 40.3 | 64.2 |
| Isocyanate Index: | 105 | 105 |

The coated films were placed in a curing oven at a temperature of 110° C. for about 8 minutes. Table 2 below compares the delamination strength results for the untreated films with the treated films for each of the formulations described above. The delamination strength in Table 2 was measured according to ASTM D3936.

TABLE 2

|  | Delamination Strength (lbs/inch) Foam/Cushion Formulation | | Delamination Strength (lbs/inch) Precoat Formulation | |
| --- | --- | --- | --- | --- |
|  | Untreated | Treated | Untreated | Treated |
| High Density Polyethylene | 0.04 | 5.4 | 1.2 | 10.3 |
| Low Density Polyethylene | 0.3 | 5.4 | 0.3 | >11.4* |
| Ethylene-Vinyl Acetate | 0.6 | 5.9 | 0.6 | >11.4* |
| Polypropylene | 0.4 | 5.0 | 1.1 | 11.4 |

*These samples could not be delaminated without destroying the film, i.e. the delamination strength exceeds the tear strength of the film.

The data in Table 2 illustrate the fact that corona-discharge treatment of the film dramatically increases the delamination strength, especially for the precoat formulation.

Although the invention has been described in detail in the foregoing for the purpose of illustration, it is to be understood that such detail is solely for that purpose and that variations can be made therein by those skilled in the art without departing from the spirit and scope of the invention except as it may be limited by the claims.

What is claimed is:

1. A process for producing a tufted good comprising:
   (A) treating a flexible film with corona-discharge at a power density of 0.2 to 30 Ws/cm 2;
   (B) contacting the treated flexible film with an uncured or a partially cured back surface of a foam layer which is adhered to the back surface of a precoated greige good, wherein the precoat comprises a reactive polyurethane system; and
   (C) curing the article formed in (B).

2. The process of claim 1, wherein the curing is at temperatures of from about 65 to about 150° C. for about 2 to 10 minutes.

3. The process of claim 1, wherein the foam layer comprises a reactive polyurethane system.

4. The process of claim 1, wherein said flexible film is a polyolefin film.

5. The process of claim 1, wherein said flexible film has a thickness of about 0.025 mm to about 1 mm.

6. The process of claim 1, wherein the power density of the corona-discharge is from 0.5 to 10 $Ws/cm^2$.

7. A process for producing a tufted good comprising:
   (A) treating a flexible film with corona-discharge at a power density of 0.2 to 20 $Ws/cm^2$;
   (B) contacting the treated flexible film with an uncured or a partially cured back surface of a foam layer adhered to a greige good wherein the foam layer comprises a reactive polyurethane system; and
   (C) curing the article formed in (B).

8. The process of claim 7, wherein the curing is at temperatures of from about 65 to about 150° C. for about 2 to 10 minutes.

9. The process of claim 7, wherein said flexible film is a polyolefin film.

10. The process of claim 7, wherein said flexible film has a thickness of about 0.025 mm to about 1 mm.

11. The process of claim 7, wherein the power density of the corona-discharge is from 0.5 to 10 $Ws/cm^2$.

* * * * *